Patented Sept. 28, 1926.

1,601,531

UNITED STATES PATENT OFFICE.

HARRY W. JEANNIN, OF TOLEDO, OHIO, ASSIGNOR TO THE JEANNIN ELECTRIC COMPANY, OF TOLEDO, OHIO, A CORPORATION OF OHIO.

ELECTRIC-MOTOR CASING.

Application filed May 11, 1925. Serial No. 29,294.

This invention relates to electric motors and is more especially concerned with motors having gas-proof casing and which are used in dusty, explosive, damp or other deleterious atmosphere.

Objects of this invention are to provide a gas-proof casing for an electric motor having the unique features of construction and arrangement hereinafter described; and to provide a new and improved air circulation system for an enclosed electric motor which effectively operates to keep the working parts sufficiently cool for efficient continuous running.

In one aspect, this invention consists in increasing the passage of cooling fluid around the working parts of an electric motor. Heretofore, air has been forced directly from one end of an electric motor to the other end, but this has proved inefficient, inadequate and insufficient to enable the motor to operate successfully over an extended period of time without frequent stops to permit cooling. An electric motor constructed in accordance with this invention, however, may be kept in operation continuously for any desired length of time without over-heating.

One embodiment of the invention is illustrated in the accompanying drawings, in which,—

Figure 1:
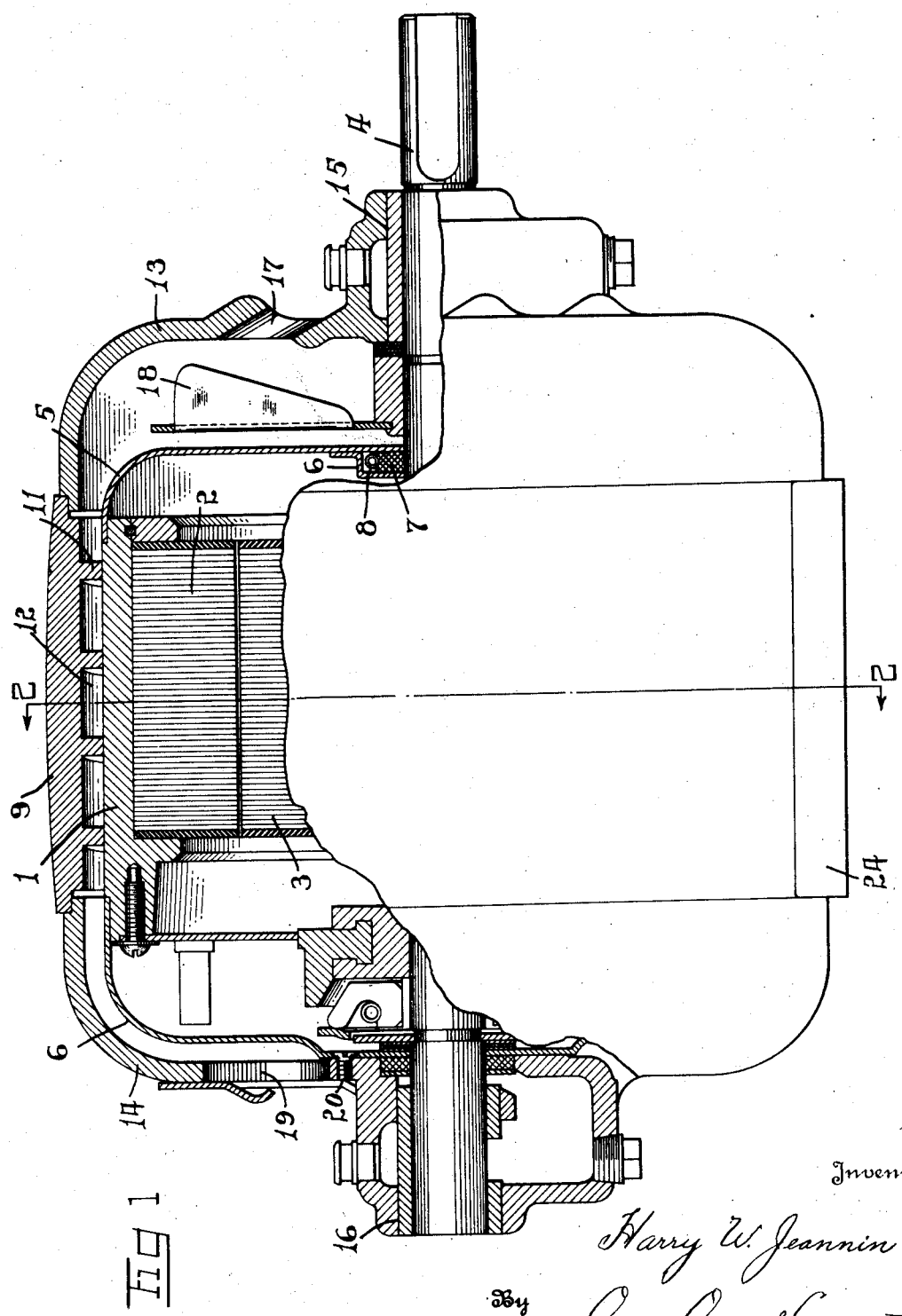
Figure 2:
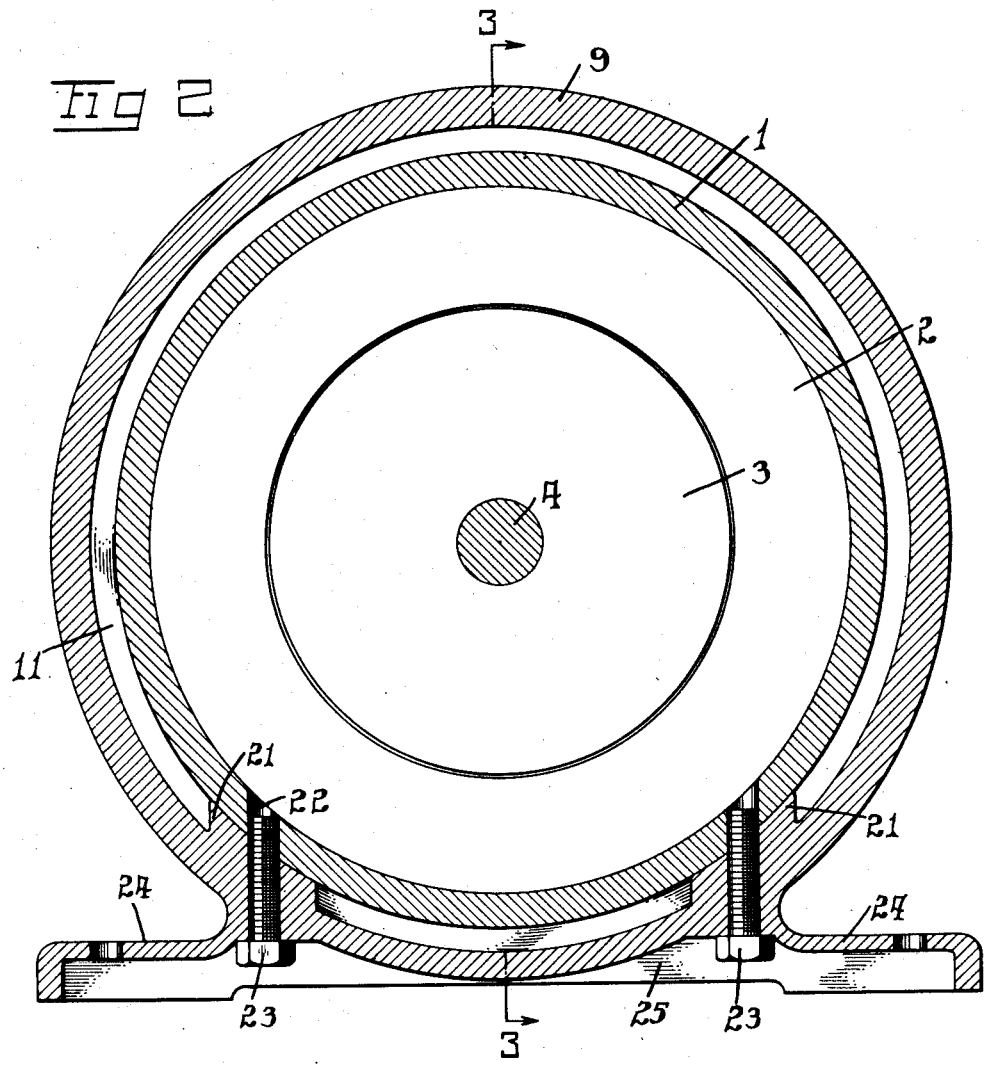
Figure 3:
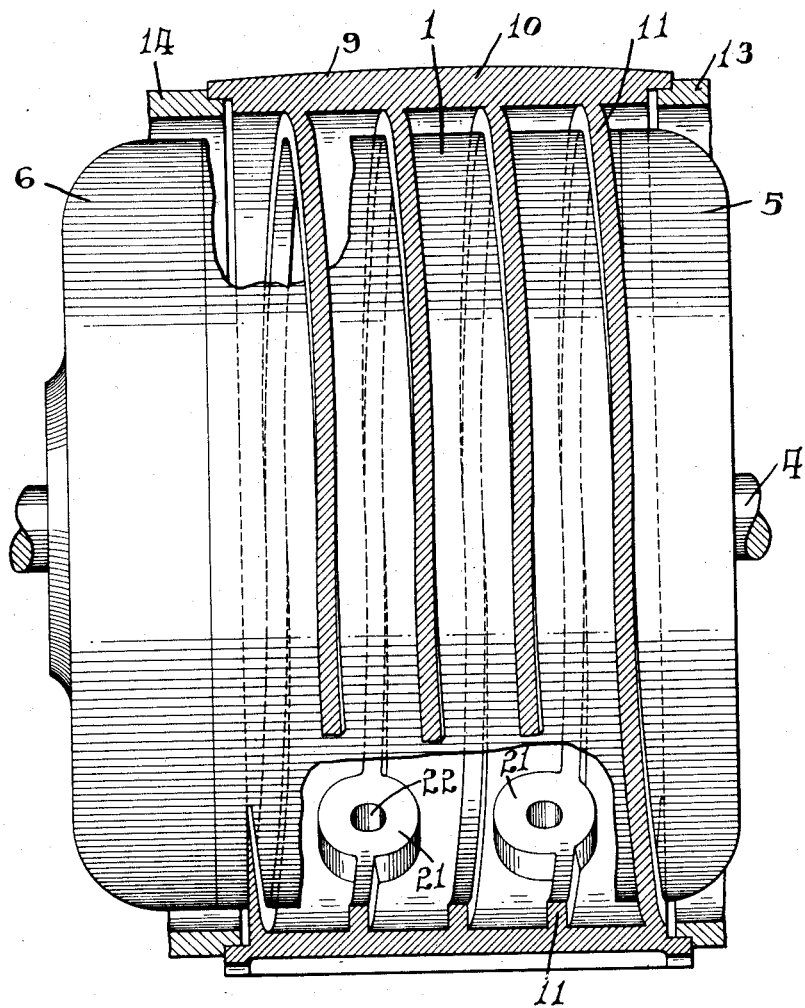

Fig. 1 is a side elevation partly in section of an electric motor embodying the invention; Fig. 2 is a transverse section on the line 2—2 of Fig. 1; and Fig. 3 is a longitudinal section on the line 3—3 of Fig. 2.

The illustrated embodiment of the invention comprises an electric motor having a frame 1, a stationary field 2, an armature element 3 and a rotor shaft 4. The construction and arrangement of the working parts of the motor forms no part of this invention, so that further detail description thereof is deemed unnecessary. The opposite ends of the frame 1 are closed by capped end plates 5 and 6 having openings through which the driven shaft 4 extends, each end plate telescoping over the frame 1 for preventing atmospheric air from entering the working parts of the motor.

In order to prevent leakage of air from between the shaft 4 and end plate 5, a flexible packing 7 surrounds the shaft and is held in place by a housing 6 which is fixed to the inner side of the end plate. The packing 7 is preferably constructed in two parts which are held together by a circular coil spring retainer 8 which also urges the packing snugly against the shaft.

The above-described motor and casing is, in the present instance, completely housed to insure against the admission of combustible or explosive gases. For this purpose a shell 9 is provided which is of sufficient diameter to receive the motor frame 1. Formed on the inside of the shell 9 is a continuous helical rib 11 against which the motor frame 1 bears, thereby providing an helical passage 12 around the motor which terminates at opposite ends thereof. The passage 12 is employed as a cooling channel through which atmospheric air is forced by a fan 18 fixed to and rotatable with the shaft 4. An outstanding advantage of utilizing such a tortuous passage resides in the fact that the passage is thereby materially lengthened so that the cooling medium is in contact with the motor frame for a longer period of time, thus maintaining the motor sufficiently cool for operating purposes throughout an indefinite period without the necessity of frequent stops.

The opposite ends of the shell 9 are closed by cap plates 13 and 14 which telescope into the shell and form a tight fit therewith. The cap plates are provided with bearings 15 and 16 to receive and support the rotor shaft 4 which projects beyond the ends of the motor frame, and formed in the plate 13 is an inlet opening 17 which is positioned adjacent the fan 18 to enable the latter to draw in atmospheric air to be forced through the cooling channel 12. The end or cap plate 14 has an outlet opening 19 through which air from the channel 12 passes to atmosphere.

To facilitate disassembly of the end plate or shield 6 of the motor so that access to the working parts may readily be obtained, the plate 6 is fastened to the inner surface of the shell plate 14 by screws 20. It will be apparent that by removal of the plate 14 the plate 6 will concomitantly be removed without further trouble, but when in position the plate 6 overlaps the motor frame 1 to prevent access of dust, dirt, etc., to the working part of the motor.

It is desirable detachably to connect the motor frame 1 to the shell 9 so that, as assembled with the motor completely encased, it may be transported from place to place as a rigid construction. Accordingly, bosses 21 are formed on the inside of the shell 9 at the base thereof and are formed with screw threaded openings 22 which are adapted to register with openings in the motor frame 1 so that screws 23 may be threaded into the registering openings from the outside. The bosses 21 are preferably arranged in pairs on opposite sides of the shell to receive the weight of the motor.

For supporting the shell 9, web-like legs 24 extend tangentially in opposite directions from the shell in the region of the bosses 21 so that the added thickness of metal adds strength to the supporting structure, the legs being connected by a web 25 for reinforcing purposes.

Among the outstanding features of the invention are the tortuous cooling channel, the unique means for removing the end plate of the motor without disturbing the remaining motor construction, the bosses for supporting the motor frame, and the manner in which the legs are reinforced by the added thickness of metal.

While I have shown and described a construction which is the best form known to me at the present time, it is to be understood that numerous changes in details of construction and arrangement may be effected without departing from the spirit of the invention, especially as defined in the appended claims.

Having thus described my invention, what I claim as new and desire to secure by Letters Patent is:

1. The combination with an encased electric motor of a supporting shell having a bore for receiving said motor in an axial direction, said shell having an open ended helical passage extending around the motor, means for forcing cooling fluid through said passage and means for detachably securing said motor to said shell.

2. The combination with an encased electric motor of a supporting shell having a bore for receiving said motor in an axial direction, and a continuous helical rib on the inside of said shell to space said motor therefrom and provide an helical passage surrounding the motor, whereby fluid may be passed through said passage for cooling the motor.

3. The combination with an encased electric motor of an open ended supporting shell having an annular bore for receiving said motor axially, a continuous helical rib on the inside of said shell to space said motor therefrom and provide an helical passage surrounding said motor, detachable closures for opposite ends of said shell, and motor operated means for passing fluid through said passage.

4. An electric motor having a frame, end plates for closing the opposite ends of said frame, an open-ended shell for receiving said frame and providing a tortuous passage around said frame from one end thereof to the other, and a fan connected to be driven by the motor on the outside of one of said end plates for forcing air through said passage.

5. The combination with a shell, a motor within said shell, bosses in the lower part of said shell on opposite sides thereof for supporting said shell, said bosses being formed with openings, and the motor frame being formed with openings to register with the boss openings, and means extending through said registering opening for detachably securing said parts together.

6. In a device of the class described, a shell for receiving an electric motor, bosses on the inside of the shell for supporting the motor, and legs connected integrally to the outside of the shell in the region of said bosses whereby the thickness of metal through the bosses serves to strengthen the supporting legs.

In testimony whereof I have hereunto signed my name to this specification.

HARRY W. JEANNIN.